United States Patent
Cremelie et al.

(10) Patent No.: US 7,769,971 B2
(45) Date of Patent: Aug. 3, 2010

(54) REPLICATION AND RESTORATION OF SINGLE-INSTANCE STORAGE POOLS

(75) Inventors: Nick Cremelie, Ghent (BE); Tom De Coninck, Ghent (BE); Koen D'Hoye, Lochristi (BE); Joris Custers, Ghent (BE)

(73) Assignee: Data Center Technologies, Cupertino, CA (US)

( * ) Notice: Subject to any disclaimer, the term of this patent is extended or adjusted under 35 U.S.C. 154(b) by 621 days.

(21) Appl. No.: 11/693,382

(22) Filed: Mar. 29, 2007

(65) Prior Publication Data

US 2008/0244204 A1    Oct. 2, 2008

(51) Int. Cl.
*G06F 12/00* (2006.01)
*G06F 13/00* (2006.01)
*G06F 13/28* (2006.01)

(52) U.S. Cl. .......... 711/162; 711/103; 707/204
(58) Field of Classification Search ............ 711/103, 711/162; 707/204
See application file for complete search history.

(56) References Cited

U.S. PATENT DOCUMENTS

| | | | |
|---|---|---|---|
| 5,649,196 A * | 7/1997 | Woodhill et al. ............ 707/204 |
| 6,389,433 B1 | 5/2002 | Bolosky et al. | |
| 6,513,051 B1 | 1/2003 | Bolosky et al. | |
| 6,920,537 B2 | 7/2005 | Ofek et al. | |
| 7,155,585 B2 * | 12/2006 | Lam et al. ................ 711/162 |
| 7,200,604 B2 | 4/2007 | Forman et al. | |
| 7,359,920 B1 * | 4/2008 | Rybicki et al. .......... 707/104.1 |
| 7,424,514 B2 | 9/2008 | Noble et al. | |
| 7,478,113 B1 | 1/2009 | De Spiegeleer et al. | |
| 2007/0050423 A1 * | 3/2007 | Whalen et al. ............. 707/200 |

* cited by examiner

*Primary Examiner*—Stephen C Elmore
*Assistant Examiner*—Mark A Giardino, Jr.
(74) *Attorney, Agent, or Firm*—Rory D. Rankin; Meyertons Hood Kivlin Kowert & Goetzel, P.C.

(57) ABSTRACT

A system and method for managing single instance storage. A computer system includes at least two backup servers, each backup server included in a single-instance storage pool. A first backup server conveys a first de-duplicated list identifying data segments from the first storage pool to a second backup server. The first backup server receives from the second backup server a second de-duplicated list identifying a subset of the data segments and conveys the subset of the data segments to the second backup server. In response to receiving the first list from the first backup server, the second backup server de-duplicates the first list against a second storage pool and conveys the second list to the first backup server. In response to receiving the subset of the data segments, the second backup server adds the received data segments to the second storage pool.

14 Claims, 8 Drawing Sheets

REPLICATION AND RESTORATION OF SINGLE-INSTANCE STORAGE POOLS

BACKGROUND OF THE INVENTION

1. Field of the Invention

This invention relates to computer systems and, more particularly, to replication and restoration of backup files within computer systems.

2. Description of the Related Art

There is an increasing need for organizations to protect data that resides on a variety of client devices via some type of backup mechanism. For example, numerous client devices may be coupled to a network to which one or more backup servers are also coupled. The backup servers may be further coupled to one or more tape drives or other backup media. A backup agent on each client device may convey data files to the backup server for storage on backup media according to a variety of schedules, policies, etc. For example, large backup datasets may be moved from a client device to a media server configured to store data for later retrieval, thereby protecting data from loss due to user error, system failure, outages, and disasters, and so on. Additionally, such backup procedures may be utilized for purposes of regulatory compliance, workflow tracking, etc.

In order to minimize the size of storage pools required to store backup data, Single Instance Storage (SIS) techniques are sometimes employed at each backup location. In some SIS techniques, data is stored in segments with each segment having a fingerprint that may be used to unambiguously identify the segment. For example, a data file may be segmented, and a fingerprint calculated for each segment. Duplicate copies of data segments are then replaced by a single instance of the segment and a set of references to the single instance. In order to retrieve a backup file, a set of fingerprints is sent to a backup server, where it is compared to the fingerprints of data stored in an associated storage pool. For each matching fingerprint, a data segment is retrieved. The resulting segments are re-assembled to produce the desired file.

In order to make data more readily available, it may be desirable to replicate portions of a storage pool. For example, the contents of a storage pool may be replicated and stored at a remote location from which they may be retrieved (e.g., to recover from a disastrous data loss). Alternatively, a multi-national enterprise may replicate a storage pool or a portion thereof during off hours to make data more easily retrievable from a variety of locations, perhaps on different continents, without the need to transmit large amounts of information on demand. In conventional systems, replication typically involves re-assembling the files to be replicated from their respective data segments stored in a source storage pool and sending them to a target storage pool where SIS techniques may be re-applied. Unfortunately, this process may lead to multiple re-assemblies of data for which there are multiple references. In addition, transmitting the resulting large datasets is costly in terms of time and bandwidth consumption. These issues also arise when data needs to be reverse replicated back to its original source storage pool, such as in the event of a server failure. In view of the above, an effective system and method for replicating single-instance storage pools that accounts for these issues is desired.

SUMMARY OF THE INVENTION

Various embodiments of a computer system are disclosed. In one embodiment, the computer system includes at least two single-instance storage pools, each storage pool including one or more backup servers. A first backup server is configured to convey a first de-duplicated list to a second backup server associated with a second storage pool that identifies one or more data segments of the first storage pool. In response to receiving the first list from the first backup server, the second backup server is configured to de-duplicate the first list against the second storage pool to create a second de-duplicated list that identifies at least a subset of the one or more data segments, and convey the second list to the first backup server. The first backup server is configured to receive the second list and convey the subset of one or more data segments to the second backup server. In response to receiving the subset of the one or more data segments, the second backup server is configured to add the subset to the second storage pool.

In a further embodiment, for each data segment stored in the first or the second single-instance storage pool, there is also stored (i) an associated fingerprint that identifies the data segment, and (ii) a reference to each of one or more clients from which a copy of the data segment was received for backup. In one embodiment, the first list includes each data segment's associated references and the second backup server is configured to de-duplicate the data segments and each data segment's associated references against the second single-instance storage pool.

These and other embodiments will become apparent upon consideration of the following description and accompanying drawings.

Figure 1:
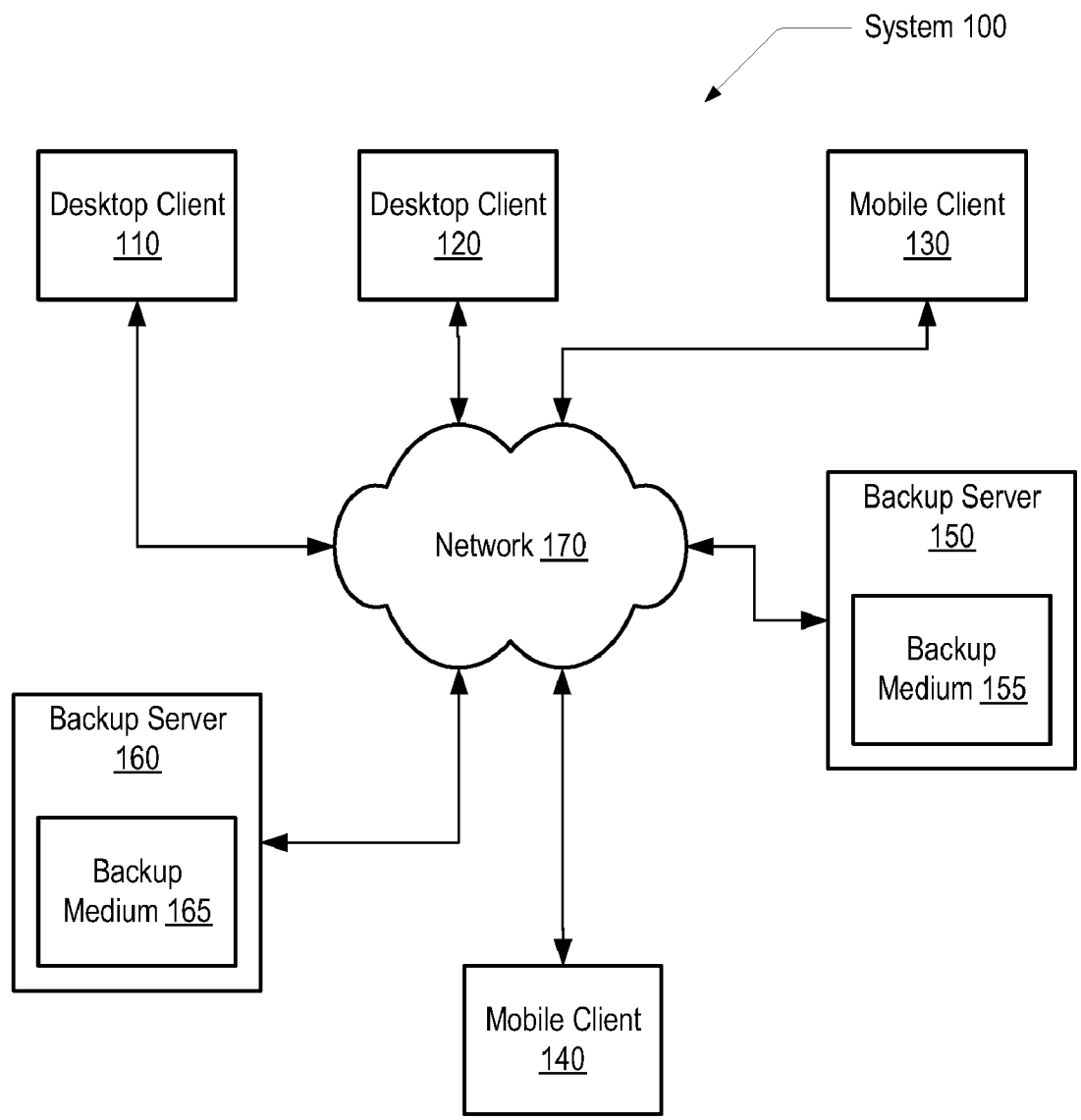
FIG. 1 illustrates one embodiment of a system of computers.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a computing system 100. As shown, system 100 includes desktop clients 110 and 120 that are representative of any number of stationary client computers. System 100 also includes mobile clients 130 and 140 that are representative of any number of mobile client computing devices such as laptops, handheld computers, etc. System 100 further includes backup servers 150 and 160, which may include backup media 155 and 165, respectively.

Backup media 155 and 165 may be removable media such as tape or disk as well as hard disk, memory, or other storage devices associated with backup servers 150 and 160. In alternative embodiments, backup media 155 and 165 may be separate from backup servers 150 and 160. Each of clients 110, 120, 130, and 140 as well as servers 150 and 160 are coupled to a network 170. Network 170 may include one or more local area networks (LANs) that may be connected to a wide area network (WAN)/Internet and or to the public switched telephone network (PSTN) via one or more modems.

In alternative embodiments, the number and type of clients is not limited to desktop clients 110 and 120 and mobile clients 130 and 140. Almost any number and combination of desktop and mobile clients may be connected to network 170 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to network 170.

Although system 100, as shown, consists of clients and servers, in alternative embodiments each device that is connected to network 170 may, at various times, take on either a client or a server role. In a further alternative embodiment, system 100 may comprise a peer-to-peer network with or without centralized control services.

Within system 100, it may be desired to protect data associated with any of clients 110, 120, 130, and 140. In order to protect client data, various backup operations are possible. For example, in one embodiment, backup server 150 and or backup medium 155 may store data from one or more clients in a first storage pool. A second copy of data from one or more clients may be stored in a second storage pool on backup server 160 and/or backup medium 165. In operation, data protection software located on each of clients 110, 120, 130, and 140 may execute in the background to perform data backups. Backup frequency and storage location may depend on a variety of factors including the urgency of data protection, availability of media storage space, network connection state, and enterprise policies. For example, in one embodiment, data from a storage pool on backup server 150 may be replicated on a storage pool on backup server 160. Such replication may be done according to a schedule or at other times determined by administrative policy, security policy, or to meet other requirements of an enterprise. In addition, at various times, data that has been replicated may be reverse-replicated. For example, data that was replicated from a storage pool on backup server 150 to a storage pool on backup server 160 may be reverse replicated to the storage pool on backup server 150. Reverse replication may be performed for a variety of reasons, such as to recover data lost due to inadvertent deletion, system failure, disasters, etc.

Figure 2:
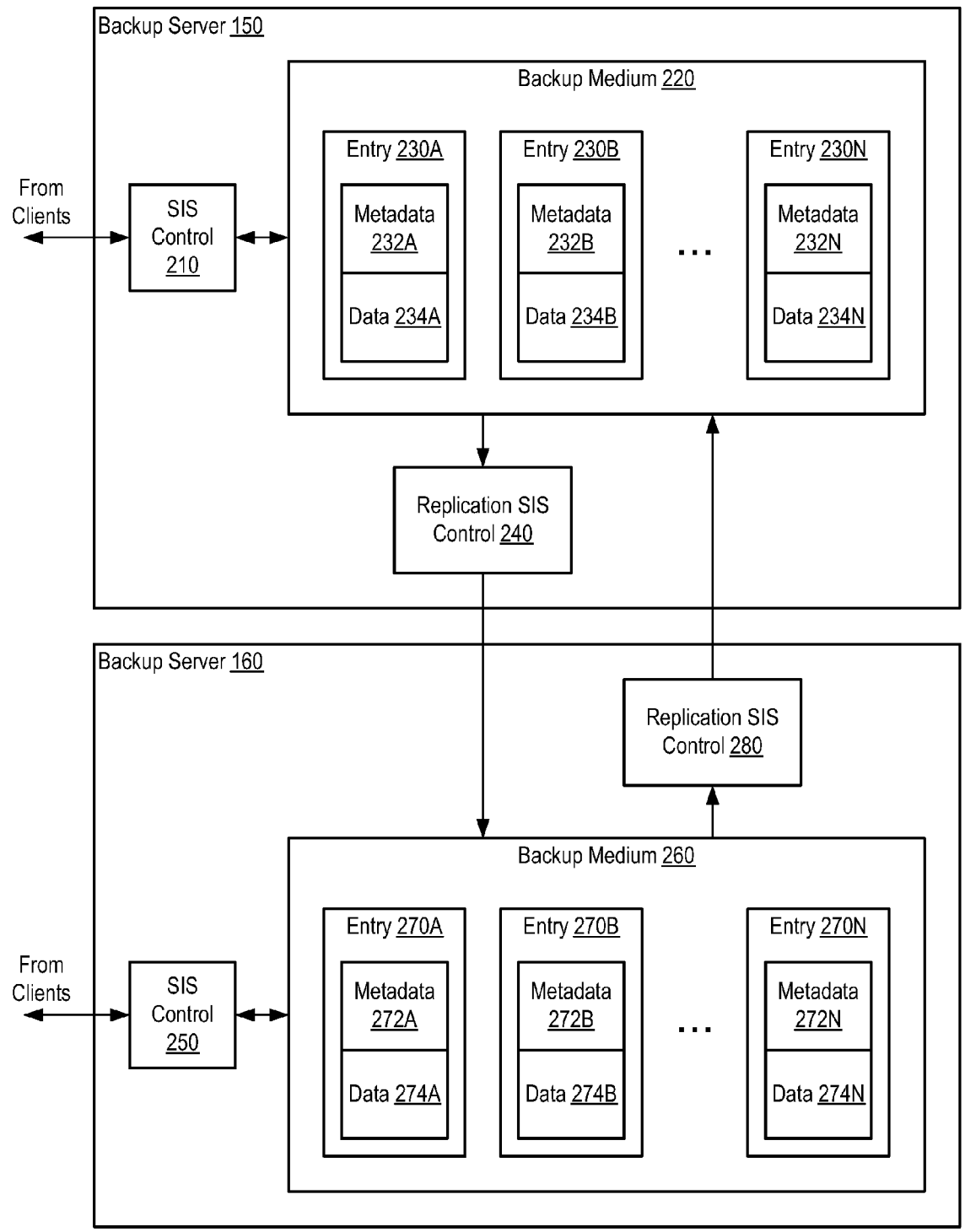
FIG. 2 is a generalized block diagram of one embodiment of a pair of backup servers.

Turning now to FIG. 2, a generalized block diagram of backup servers 150 and 160 is shown. Backup server 150, as shown, includes a single-instance storage (SIS) control 210, a backup medium 220, and a replication SIS control 240. Backup server 150 is representative of one or more backup servers that together form a first storage pool. Backup medium 220 includes data entries 230A-230N. Elements referred to herein by a reference numeral followed by a letter may be collectively referred to by the reference numeral alone. For example, data entries 230A-230N may be referred to as data entries 230. Each entry 230 includes data 234 and associated metadata 232. Similarly, backup server 160 includes a single-instance storage control 250, a backup medium 260, and a replication SIS control 280. Backup server 160 is representative of one or more backup servers that together form a second storage pool. Backup medium 260 includes data entries 270A-270N. Each entry 270 includes data 274 and associated metadata 272.

During operation, clients may backup data to backup server 150. For example, a backup agent operating on a client may transmit data entities to backup server 150 via network 170. A data entity, as used herein, may comprise one or more files and/or segments of files or other data structures. Within backup server 150, SIS control 210 may receive data entities, perform de-duplication of the received data entities, and store the resulting data and metadata as one or more entries 230. De-duplication, as used herein, refers to a process that includes finding multiple copies of data entities and replacing them with a single copy of the entity plus a reference to the entity for each copy. Copies of data entities may be identified by comparing a digital fingerprint of one entity to the fingerprint of another entity. If the fingerprints match, then the two entities may be deemed to be copies of one other. A digital fingerprint for a data entity may be created by applying some function, such as a hash function, to the data entity. In one embodiment, the digital fingerprints are encrypted. In one embodiment, a fingerprint generation function may comprise a Message-Digest algorithm 5 (MD5) hash function. Alternative hash functions include Secure Hash Algorithm (SHA), a checksum, signature data, and any other suitable function, cryptographic, or otherwise, for identifying a data entity. Each entry 230 within backup medium 220 may include a data entity 234 and associated metadata 232 that includes the references to data entity 234 produced during de-duplication. A more detailed description of an entry 230 is given below.

Data may be stored on backup server 160 in backup medium 260 in a similar manner. In addition, at various times, data may be replicated from one storage pool to another. More specifically, in one embodiment, replication SIS control 240 may assemble a set of data entities and transfer them from backup medium 220 to backup medium 260. A reverse replication may also be performed in which replication SIS control 280 may assemble a set of data entities and transfer them from backup medium 260 to backup medium 220. Further details of the operation of replication SIS controls 240 and 280 are given below.

Figure 3:
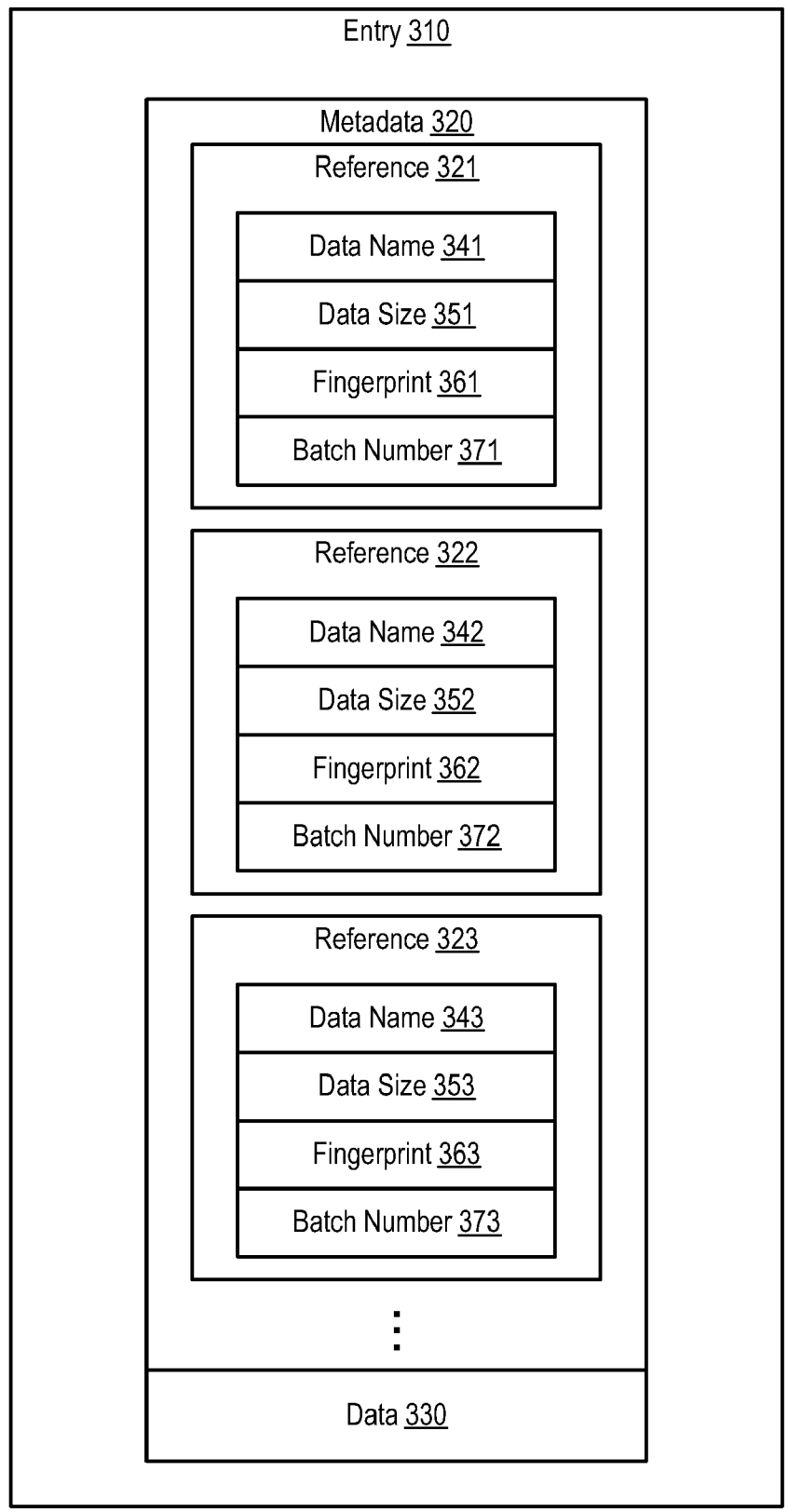
FIG. 3 illustrates one embodiment of a storage pool data entry.

FIG. 3 is a generalized block diagram of one embodiment of an entry 310 representing one of entries 230 or 270 of FIG. 2. Each entry 310 may include a metadata portion 320 and an associated data portion 330. Metadata 320 may include one or more metadata references such as references 321-323 as shown. Each reference may include information describing the associated data 330. For example, reference 321 includes a data entity name 341, data size 351, a fingerprint 361 of data 330, a batch number 371. Batch number 371 may be used to identify the particular backup operation in which the associated reference 321 to data 330 was created. Similar data is shown for references 322 and 323. Each reference may include other information such as type, version number, ownership, permissions, modification time, error code, etc. Other forms of metadata and/or identifiers will be apparent to those of ordinary skill in the art.

Figure 4:
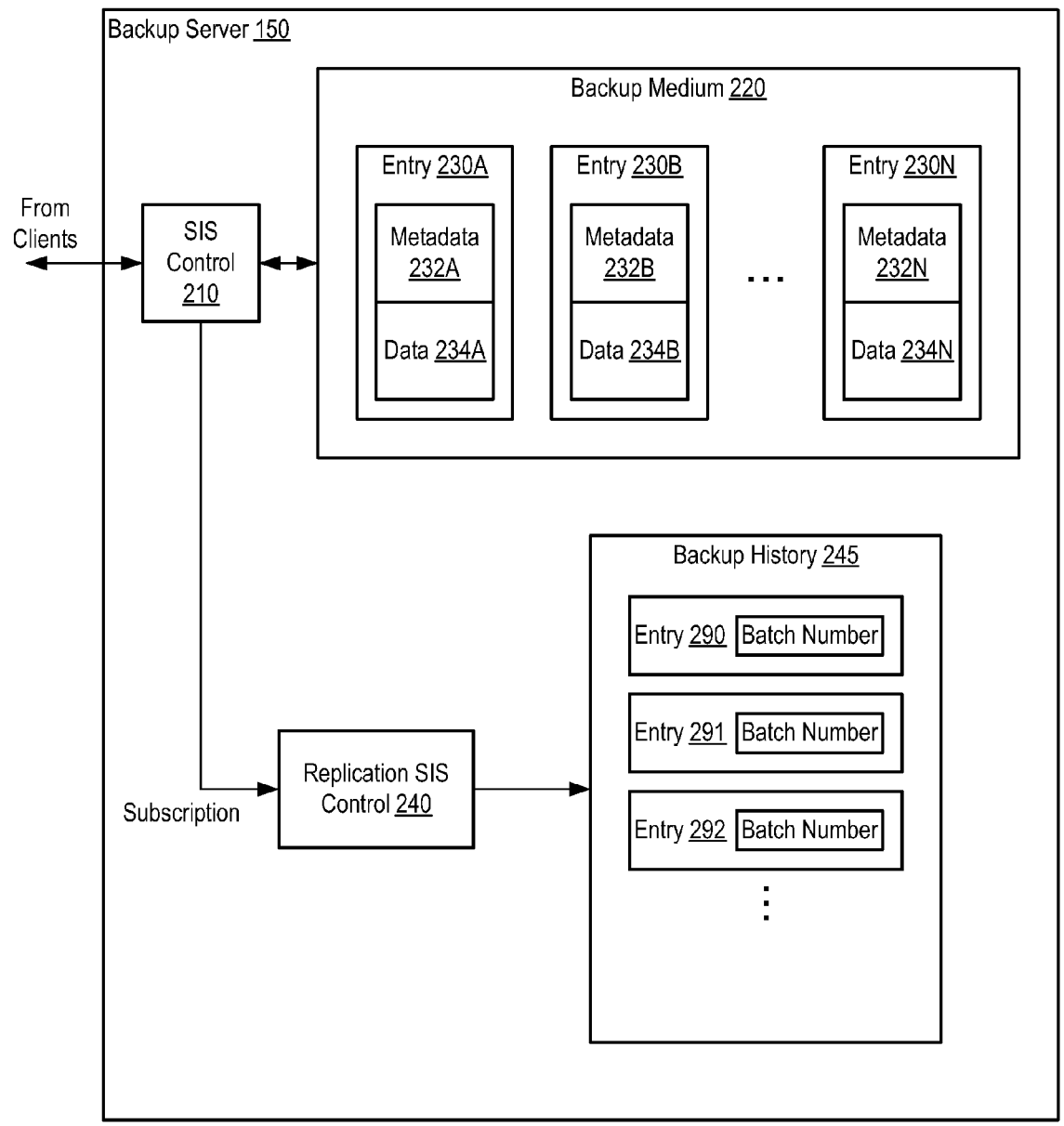
FIG. 4 is a more detailed block diagram of one embodiment of backup server.

FIG. 4 is a more detailed block diagram of one embodiment of backup server 150. In addition to SIS control 210, backup medium 220 and replication SIS control 240, a backup history 245 is shown. During operation, replication SIS control 240 may subscribe to backup updates from SIS control 210 and store corresponding entries in backup history 245. More specifically, during a backup operation, SIS control 210 may receive a batch of data segments labeled with a batch number. The batch number may be sent to the subscribing replication SIS control 240. In one embodiment, backups may be incremental, i.e. when a data entity is modified, only the new data segments may be sent to backup server 150. For each batch number received, replication SIS control 240 may create an entry in backup history 245. For example, in the illustrated embodiment, replication SIS control 240 has created entries 290-292 in backup history 245, each of which includes a respective batch number. Entries in backup history 245 correspond to the backup batches that have been received since the last replication operation. During a replication, the entries that have been stored in backup history 245 are used to determine which batches to replicate, rather than replicating all of backup medium 220. Once a replication is completed, backup history 245 may be cleared.

Figure 5:
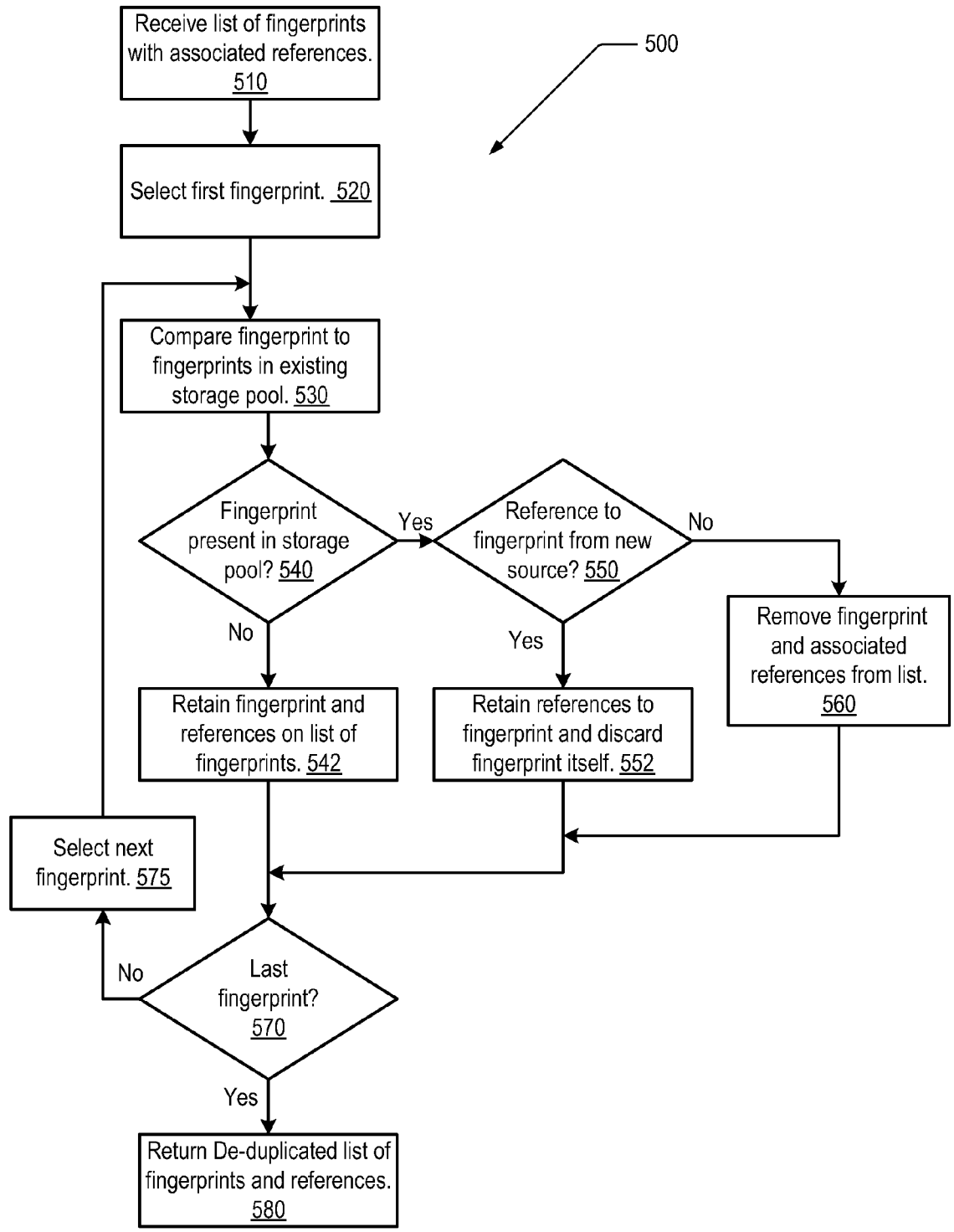
FIG. 5 illustrates one embodiment of a process for de-duplicating a dataset before storing it in a storage pool.

FIG. 5 illustrates one embodiment of a process 500 for de-duplicating a dataset before storing it in a storage pool. Process 500 may begin with the reception of a list of fingerprints that are associated with a group of data segments, such as a backup dataset (block 510). Each fingerprint in the list may include one or more references, each of which indicates that a source has a copy of the data segment. For instance, if more than one backup agent has contributed a copy of a data segment to a backup dataset, the backup dataset may include a single instance of the segment with a reference to each source agent. Once the list of fingerprints is received, a fingerprint is selected (block 520). The selected fingerprint may be compared to fingerprints in the storage pool (block 530). If the selected fingerprint does not match the fingerprints of any data segment that is already present in the storage pool (decision block 540), then the fingerprint and its associated references may be maintained on the list (block 542). If the selected fingerprint does match the fingerprint of a data segment that is already present in the storage pool (decision block 540), then the references associated with the selected fingerprint may be compared to the references that are already associated with the matching fingerprint from the storage pool (decision block 550). If a reference does not match any existing reference to the matching fingerprint, the reference may be maintained on the list (block 552). If the reference matches any existing reference to the matching fingerprint the reference may be removed from the list. Once all of the references have been compared, the matching fingerprint may be removed from the list (block 560), retaining any references that did not match. Once the comparisons of the selected fingerprint and its references have been completed, if the selected fingerprint is the last fingerprint on the list (decision block 570), then de-duplication of the list is complete and the de-duplicated list may be returned (block 580). Otherwise, another fingerprint may be selected (block 575) and process 500 may return to block 530 such that fingerprint and reference comparisons are executed for each list entry.

Figure 6:
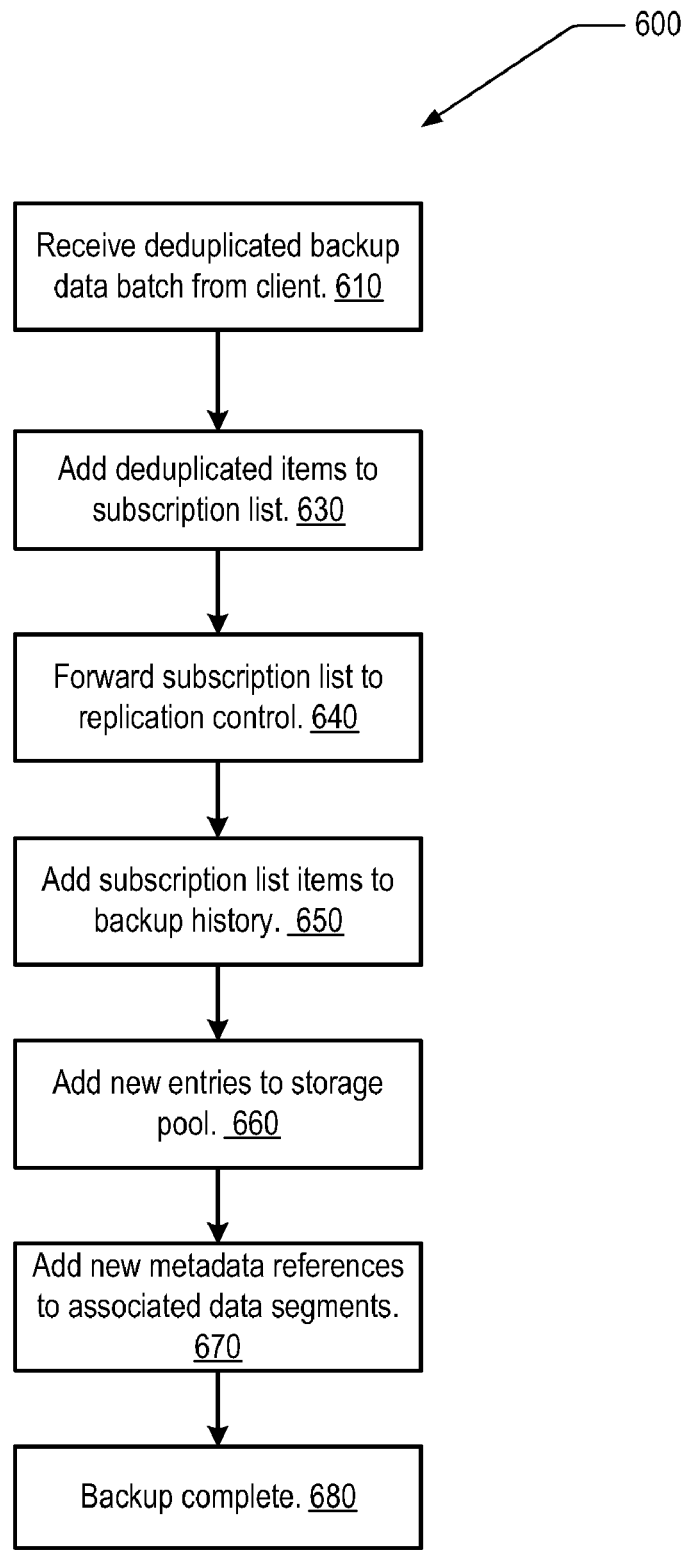
FIG. 6 illustrates one embodiment of a process for adding a backup dataset to a single-instance storage pool.

FIG. 6 illustrates one embodiment of process 600 for adding a backup dataset to a single-instance storage pool. Process 600 may begin with the reception of a deduplicated backup data batch (block 610). For example, a backup server in a client-server computer network may receive a data batch to be stored in a backup storage pool from a backup agent executing on a client in the network. Further, the batch may be filtered according to a process such as the one illustrated in FIG. 5. In an alternative embodiment, if the backup data batch is not deduplicated by the sending client, it may be deduplicated upon reception by the receiving backup server. Once the data batch is received, each item in the batch may be added to a subscription list (block 630). The items on the subscription list may be forwarded to a replication control (block 640), where they may be stored in a backup history (block 650). In addition, new data segments from the de-duplicated batch may be added to the single-instance storage pool (block 660) and new references from the de-duplicated batch to existing data segments may be added to their associated data segments in the single-instance storage pool (block 670). After all of the new data segments and references have been added to the single-instance storage pool, process 600 is complete (block 680).

Figure 7:
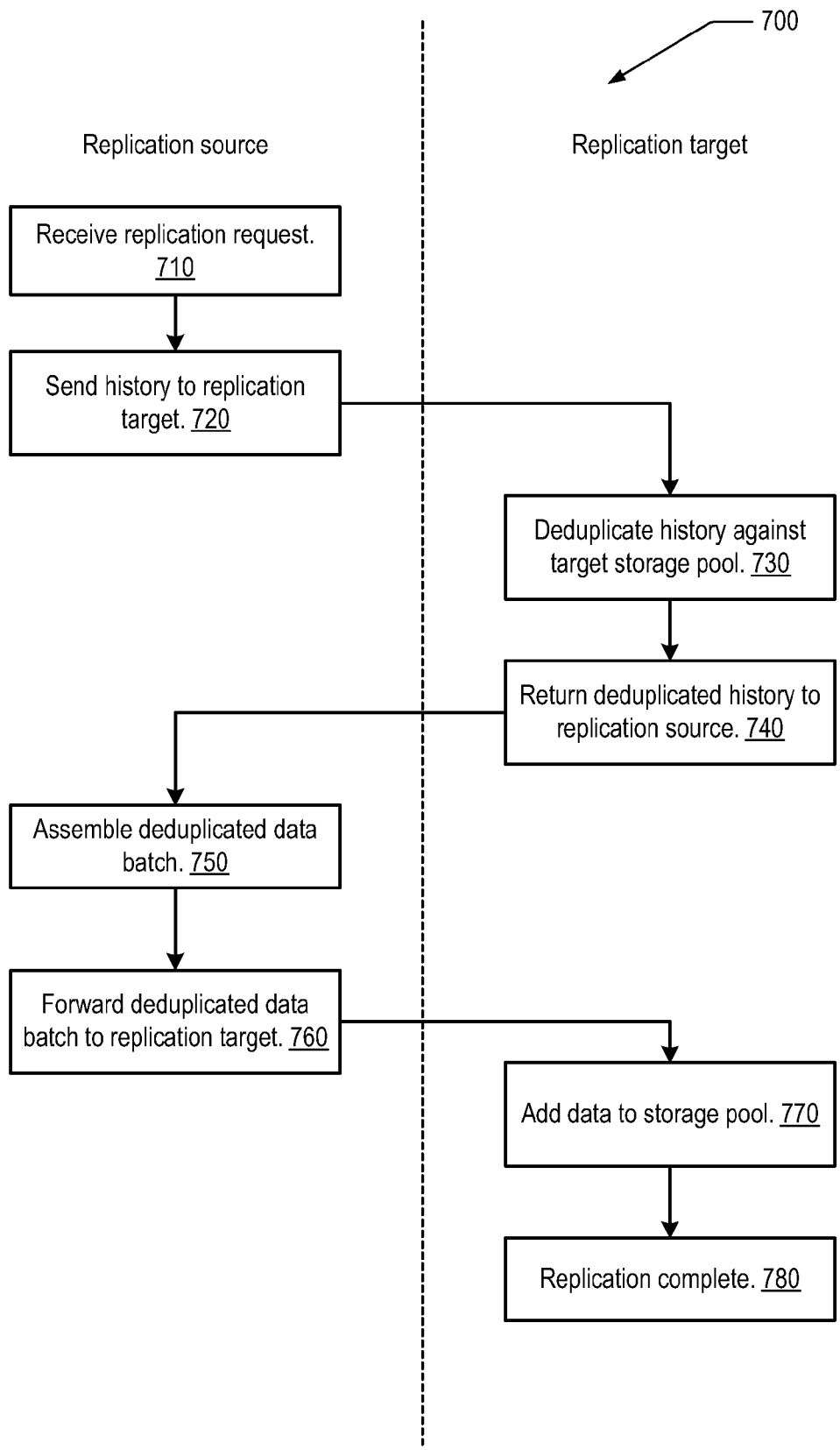
FIG. 7 illustrates one embodiment of a process for replicating a single-instance storage pool.

FIG. 7 illustrates one embodiment of process 700 for replicating a single-instance storage pool. In process 700, a storage pool from a replication source (left side of FIG. 7) may be replicated to a target pool on a replication target (right side of FIG. 7). The replication source and target may be, for example, two backup servers. Process 700 may begin with the reception of a replication request at a replication source (block 710). In response to the replication request, the replication source may send a history consisting of a list of data segments and references to the replication target (block 720). In one embodiment, the history may comprise a list of data segments and references that have changed in the source single-instance storage pool since the last replication. In response to receiving the history, the replication target may de-duplicate the history against the target single-instance storage pool (block 730) and return the de-duplicated history to the replication source (block 740). In response to receiving the de-duplicated history, the replication source may assemble a corresponding de-duplicated data batch (block 750) and forward the de-duplicated data batch to the replication target (block 760). In response to receiving the de-duplicated data batch, the replication target may add the data segments and references from the de-duplicated data batch to the target single-instance storage pool (block 770). After all of the batched data segments and references have been added to the target single-instance storage pool, process 700 is complete (block 780).

Figure 8:
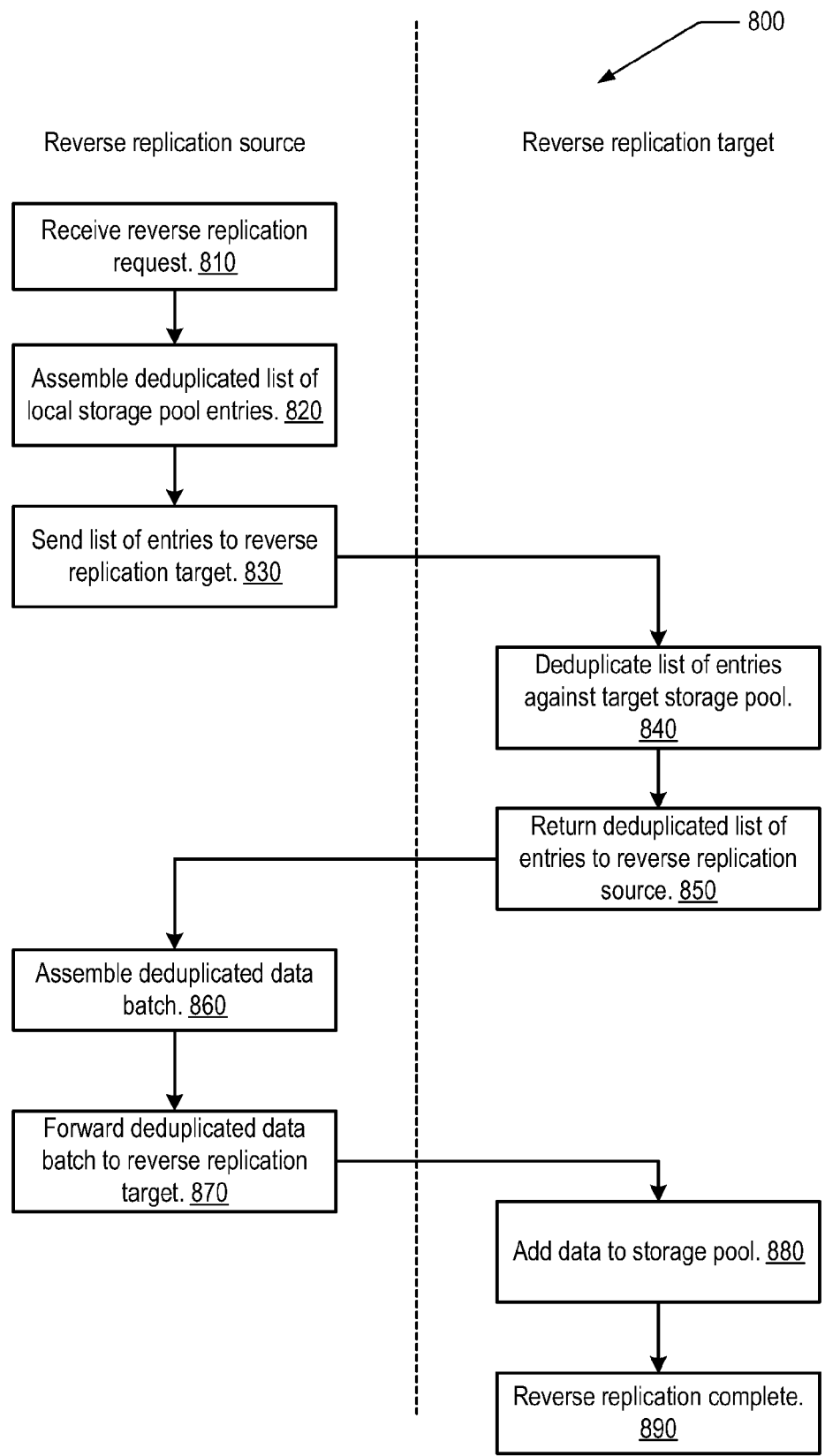
FIG. 8 illustrates one embodiment of a process for reverse replicating a single-instance storage pool.

FIG. 8 illustrates one embodiment of process 800 for reverse replicating a single-instance storage pool. In process 800 a storage pool from a reverse replication source (left side of FIG. 8) may be reverse replicated to a target pool on a reverse replication target (right side of FIG. 8). The reverse replication source and target may be, for example, two backup servers. Process 800 may begin with the reception of a reverse replication request at a reverse replication source (block 810). In response to the reverse replication request, the reverse replication source may assemble a de-duplicated list of local storage pool entries (block 820) and send the list to the reverse replication target (block 830). In one embodiment, the list may include entries corresponding to data segments and references that have changed in the source single-instance storage pool since the last reverse replication. In response to receiving the list, the reverse replication target may de-duplicate the list against the target single-instance storage pool (block 840) and return the de-duplicated list to the reverse replication source (block 850). In response to receiving the de-duplicated list, the reverse replication source may assemble a corresponding de-duplicated data batch (block 860) and forward the de-duplicated data batch to the reverse replication target (block 870). In response to receiving the de-duplicated data batch, the reverse replication target may add the data segments and references from the de-duplicated data batch to the target single-instance storage pool (block 880). After all of the batched data segments and references have been added to the target single-instance storage pool, process 800 is complete (block 890).

It is noted that the above-described embodiments may comprise software. In such an embodiment, the program instructions that implement the methods and/or mechanisms may be conveyed or stored on a computer readable medium.

Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
 a first storage pool; and
 a second storage pool;
 wherein a first backup server of the first storage pool is configured to:
   convey a first de-duplicated list identifying one or more data segments from the first storage pool to a second backup server associated with the second storage pool;
   receive from the second backup server a second de-duplicated list identifying at least a subset of the one or more data segments; and
   convey the subset of the one or more data segments to the second storage pool;
 wherein each client of one or more clients included in the system is configured to:
   assemble a batch of data segments including only data segments that do not have a backup copy already stored in the first storage pool;
   convey the assembled batch to the first backup server; and
   assign a batch number to the data segments and references in the assembled batch; and
 wherein the first backup server is further configured to:
   store batch numbers in a backup history;
   select only data segments and references for inclusion in the first list whose batch numbers are stored in the backup history; and
   clear the backup history after conveying said subset to the second storage pool.

2. The system as recited in claim 1,
 wherein in response to receiving the first list from the first backup server, the second backup server is configured to:
   de-duplicate the first list against the second storage pool to create the second de-duplicated list; and
   convey the second de-duplicated list to the first backup server;
 wherein in response to receiving said subset of the one or more data segments, the second backup server is further configured to add the subset of the one or more data segments to the second storage pool.

3. The system as recited in claim 2, further comprising one or more clients,
 wherein for each data segment stored in the first or the second storage pool, there is stored a fingerprint that identifies the data segment and a reference to each client from which a copy of the data segment was received for backup; and
 wherein to de-duplicate the first list, the second backup server is further configured to de-duplicate the data segments and each data segment's associated references against the second storage pool.

4. The system as recited in claim 3, wherein the fingerprints identifying the data segments are encrypted.

5. The system as recited in claim 2, wherein in response to a request to reverse replicate at least a portion of a second storage pool, the second backup server is configured to:
 convey a first de-duplicated reverse list identifying one or more data segments to the first backup server;
 receive from the first backup server a second de-duplicated reverse list identifying at least a subset of the one or more data segments of the first de-duplicated reverse list; and
 convey the at least a subset of the one or more data segments to the first backup server;
 wherein in response to receiving the first reverse list from the second backup server, the first backup server is configured to:
   de-duplicate the first reverse list against the first storage pool; and
   convey the second de-duplicated reverse list to the second backup server; and
 wherein in response to receiving the at least a subset of the one or more data segments, the first backup server is further configured to add the at least a subset of the one or more data segments to the first storage pool.

6. A method of replicating single-instance storage pools between backup servers, the method comprising a first backup server:
 conveying a first de-duplicated list identifying one or more data segments from a first storage pool to a second backup server associated with a second storage pool;
 receiving from the second backup server a second de-duplicated list identifying at least a subset of the one or more data segments; and
 conveying the at least a subset of the one or more data segments to the second backup server;
 assembling a batch of data segments including only data segments that do not have a backup copy already stored in the first storage pool;
 conveying the assembled batch to the first backup server;
 assigning a batch number to the data segments and references in the assembled batch;
 in response to receiving an assembled batch:
   storing a batch number in a backup history;
   selecting only data segments and references for inclusion in the first list whose batch numbers are stored in the backup history; and
   clearing the backup history after conveying said subset to the second backup server.

7. The method as recited in claim 6, further comprising the second backup server:
 de-duplicating the first de-duplicated list against the second storage pool to create a second de-duplicated list, in response to receiving the first list from the first backup server;
 conveying the second de-duplicated list to the first backup server; and
 the first backup server adding the subset of the one or more data segments to the first storage pool in response to receiving said subset.

8. The method as recited in claim 7, further comprising:
 for each data segment stored in the first or the second storage pool, storing a fingerprint that identifies the data segment and a reference to each of one or more clients from which a copy of the data segment was received for backup; and
 wherein de-duplicating the first list against a second storage pool further comprises de-duplicating the data segments and each data segment's associated references against the second storage pool.

9. The method as recited in claim 8, wherein the fingerprints identifying the data segments are encrypted.

10. The method as recited in claim 7, further comprising the second backup server:
conveying a first de-duplicated reverse list identifying one or more data segments from the second storage pool to the first backup server;
receiving from the first backup server a second de-duplicated reverse list identifying at least a subset of the one or more data segments of the first de-duplicated reverse list; and
conveying the at least a subset of the one or more data segments to the first backup server; and
the first backup server:
de-duplicating the first de-duplicated reverse list against the first storage pool, in response to receiving the first reverse list from the second backup server;
conveying the second de-duplicated reverse list to the second backup server; and
adding the at least a subset of the one or more data segments to the first storage pool in response to receiving the at least a subset of the one or more data segments.

11. A computer readable medium storing computer instructions that are executable by a processor to:
cause a first backup server to:
convey a first de-duplicated list identifying one or more data segments from a first storage pool to a second backup server associated with a second storage pool;
receive from the second backup server a second de-duplicated list identifying at least a subset of the one or more data segments; and
convey the at least a subset of the one or more data segments to the second backup server;
assemble a batch of data segments including only data segments that do not have a backup copy already stored in the first storage pool;
convey the assembled batch to the first backup server;
assign a batch number to the data segments and references in the assembled batch;
in response to receiving an assembled batch:
store a batch number in a backup history;
select only data segments and references for inclusion in the first list whose batch numbers are stored in the backup history; and
clear the backup history after conveying said subset to the second backup server.

12. The computer readable medium as recited in claim 11, wherein the instructions are further executable to cause the second backup server to:
de-duplicate the first list against the second storage pool, in response to receiving the first list from the first backup server;
convey the second de-duplicated list to the first backup server; and
cause the first backup server to add the at least a subset of the one or more data segments to the first storage pool in response to receiving the at least a subset of the one or more data segments.

13. The computer readable medium as recited in claim 12, wherein the instructions are further executable to:
for each data segment stored in the first or the second storage pool, store an associated fingerprint identifying the data segment and a reference to each of one or more clients from which a copy of the data segment was received for backup, wherein the list includes each data segment's associated references; and
wherein to de-duplicate the first list against a second storage pool further comprises de-duplicating the data segments and each data segment's associated references against the second storage pool.

14. The computer readable medium as recited in claim 13, wherein the fingerprints identifying the data segments are encrypted.

* * * * *